(12) United States Patent
Jangaard et al.

(10) Patent No.: US 9,176,577 B2
(45) Date of Patent: Nov. 3, 2015

(54) SPHERICAL THREE-DIMENSIONAL CONTROLLER

(75) Inventors: Lars A. Jangaard, West Hills, CA (US);
Bran Ferren, Beverly Hills, CA (US);
Elijah H. Kleeman, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 13/994,685

(22) PCT Filed: Sep. 7, 2012

(86) PCT No.: PCT/US2012/054310
§ 371 (c)(1),
(2), (4) Date: Jun. 14, 2013

(87) PCT Pub. No.: WO2013/036870
PCT Pub. Date: Mar. 14, 2013

(65) Prior Publication Data
US 2013/0257719 A1    Oct. 3, 2013

Related U.S. Application Data

(60) Provisional application No. 61/532,821, filed on Sep. 9, 2011.

(51) Int. Cl.
*G06F 3/01* (2006.01)
*G06F 1/16* (2006.01)
*G06F 3/0338* (2013.01)

(52) U.S. Cl.
CPC *G06F 3/01* (2013.01); *G06F 1/169* (2013.01); *G06F 1/1616* (2013.01); *G06F 3/0338* (2013.01)

(58) Field of Classification Search
CPC ... G06F 1/169; G06F 3/03549; G06F 3/0338; G06F 3/01
USPC .................. 345/156, 158, 167, 184
See application file for complete search history.

(56) References Cited

U.S. PATENT DOCUMENTS 5,589,828 A * 12/1996 Armstrong ............... 345/161
6,144,368 A    11/2000 Ooka et al.
(Continued)

FOREIGN PATENT DOCUMENTS

JP    2000-305709    11/2000
JP    2002-181640    6/2002
(Continued)

OTHER PUBLICATIONS

International Search Report and Written Opinion of the International Searching Authority in International Patent Application No. PCT/US2012/054310, 13 pages.
(Continued)

*Primary Examiner* — Allison Johnson
(74) *Attorney, Agent, or Firm* — Blakely, Sokoloff, Taylor & Zafman LLP

(57) ABSTRACT

A three-dimensional control apparatus including a casing, the casing including a first surface and a second surface, the first surface being opposite to the second surface; and a three-dimensional (3D) controller including a first cap actuator, the first cap actuator including a first rounded control surface, at least a portion of the first rounded control surface extending beyond the first surface of the casing; a second cap actuator, the second cap actuator including a second rounded control surface, at least a portion of the second rounded control surface extending beyond the first surface of the casing, the first rounded control surface being aligned with the second rounded control surface; a first sensor to detect force on the first cap actuator; and a second cap sensor to detect force on the second cap actuator.

22 Claims, 8 Drawing Sheets

(56) References Cited

U.S. PATENT DOCUMENTS

| | | | |
|---|---|---|---|
| 6,388,655 B1 * | 5/2002 | Leung | 345/156 |
| 6,417,838 B1 * | 7/2002 | Inamura | 345/157 |
| 7,508,377 B2 * | 3/2009 | Pihlaja et al. | 345/156 |
| 2005/0195156 A1 | 9/2005 | Pihlaja et al. | |
| 2006/0197750 A1 | 9/2006 | Kerr et al. | |
| 2009/0131117 A1 | 5/2009 | Choi | |
| 2010/0007606 A1 | 1/2010 | Shkolnikov | |
| 2012/0287032 A1 * | 11/2012 | Olssen | 345/156 |

FOREIGN PATENT DOCUMENTS

| | | |
|---|---|---|
| KR | 10-2010-0032567 | 3/2010 |
| KR | 10-2011-0026959 | 3/2011 |
| KR | 10-2011-0026960 | 3/2011 |
| WO | WO-2005-085987 | 9/2005 |

OTHER PUBLICATIONS

Extended European Search Report dated Apr. 10, 2015, in European Patent Application No. 12830316.1, 6 pages.

Official Action mailed Apr. 7, 2015 (+ English translation), in Japanese Patent Application No. 2014-529920, 12 pages.

* cited by examiner

SPHERICAL THREE-DIMENSIONAL CONTROLLER

CROSS-REFERENCE TO RELATED APPLICATIONS

This application is a national phase filing of PCT/US2012/054310 filed Sep. 7, 2012, and claims priority from U.S. Provisional Patent Application Ser. No. 61/532,821, filed Sep. 9, 2011 and entitled "Spherical Control Device", which applications are incorporated herein by reference in their entireties.

TECHNICAL FIELD

Embodiments of the invention generally relate to the field of electronic devices and, more particularly, to a method and apparatus for a spherical three-dimensional controller.

BACKGROUND

Computing devices, including desktop computers and laptop and notebook computers, are increasingly utilized for applications that are not limited to two-dimensional (2D) operation, but rather use three-dimensional (3D) space.

3D imagery and interaction in multiple possible forms, using the perception of humans of relative depth via a variety of mechanisms, including stereopsis, occlusion, linear perspective, and changing optical properties at distance, present an emerging frontier in personal computing. True three-dimensional movies, simulations, CAD (Computer Aided Design), and gaming are now within reach due to increases in processing power, improved display technologies, and more sophisticated software tools.

Computing device users are growing increasingly comfortable with the concept of working within a virtual world embodied by the computing interface. Users thus expect that the ease, precision, and depth of their interactions within the virtual world closely approximate that of the physical world.

However, computing systems such as laptop computers and other similar systems generally do not provide the user an effective means of providing 3D input. Conventional options may include multi-axis peripheral input devices, but such devices are ungainly and do not properly support sophisticated 3D applications.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
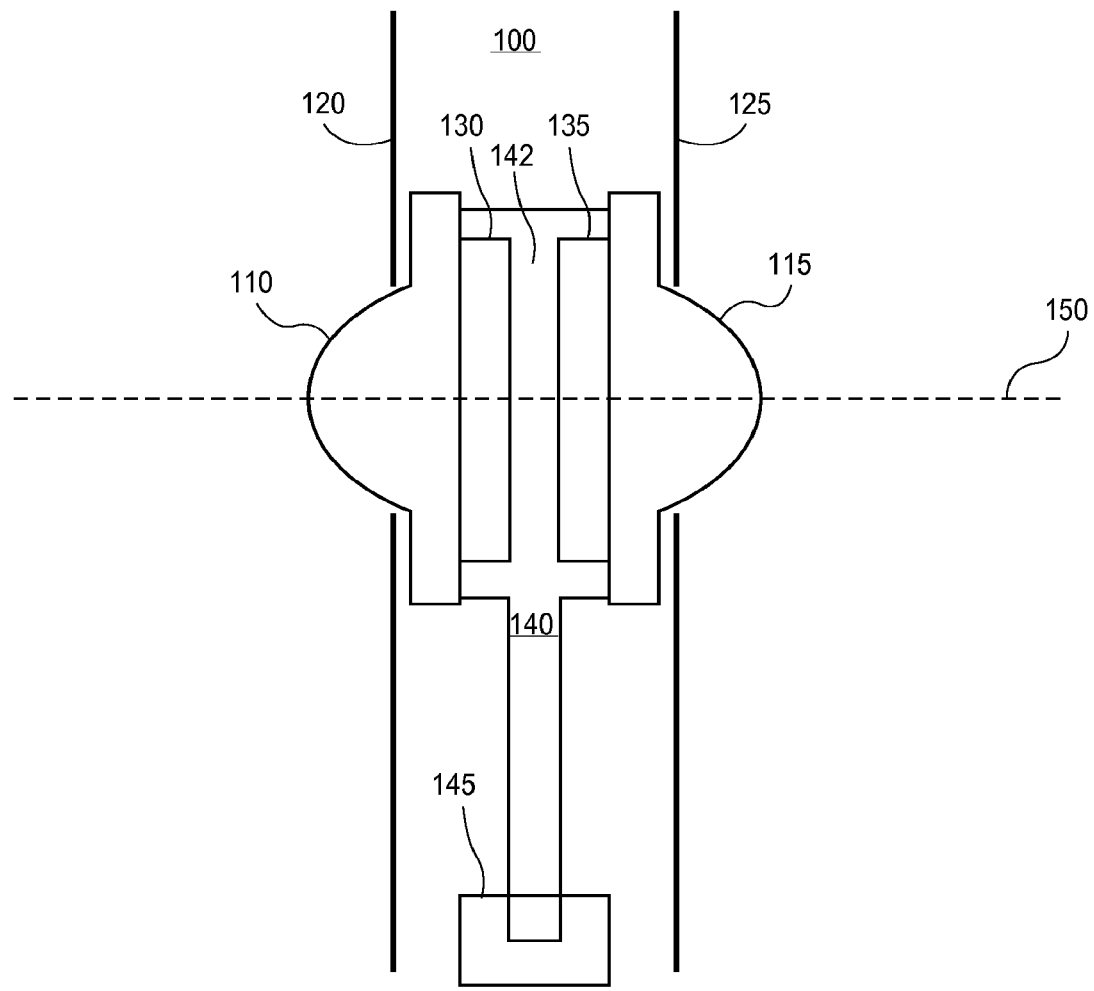
FIG. 1 is a illustration of an embodiment of a 3D controller for a computing apparatus or system.

Embodiments of the invention are generally directed to a spherical three-dimensional controller.

As used herein:

"Computing apparatus or system" means an electronic apparatus or system that provides processing operations, including a personal computer, laptop or netbook computer, tablet computer, video game console, smart phone, personal digital device, handheld computer, or other similar device.

"Casing" means an external case or cover of an apparatus.

In some embodiments, a spherical three-dimensional controller (which may be referred to herein as a 3D controller, or controller) is provided for 3D command control of computing apparatuses and systems. In some embodiments, one or more 3D controllers may be included in a computing system, such as a control in or on a surface of a casing of an apparatus such as a laptop or notebook computer or integrated in a computer monitor, or may be separate unit, such as a stand-alone control device.

In some embodiments, a spherical 3D controller (which may be referred to as a UniBall controller) may be utilized to provide precise and accurate inputs, including 3D inputs, in a compact form, where such form factor is particularly suited for integration within a laptop computer casing or other similar control location. In some embodiments, the size of the controller, which may be similar to a marble or similarly sized object, is well matched for operation by application of the fingertips of a user's hands. In operation, manipulation of the controller may be provided, for example, between a thumb and forefinger to allow a tactilely simple and familiar experience for a user. In some embodiments, a controller is a force-sensing input device, and thus continuous inputs to the controller are possible without reliance on the repetitive motions, such as "scrubbing" across a surface, familiar to touchpad users. These factors thus may provide for a more comfortable, less fatiguing interface in comparison with conventional input controllers.

In some embodiments, a controller comprises two opposing, actuators, which may be referred to herein as caps or cap actuators, such as a first cap actuator and a second cap actuator. In some embodiments, a cap actuator includes a rounded control surface. In some embodiments, the cap actuators are mounted on or partially within a first side and a second side of a casing, where each rounded cap actuator further includes a base, where the base may be a circular base. In an example, the first side may be a front side of a laptop computer display casing and the second side may be a backside of the laptop computer display casing, but embodiments are not limited to such an implementation. In some embodiments, the rounded control surface of the cap actuator may be shaped at least in part as spherical caps, where a spherical cap represents a portion of a sphere that is divided by an intersecting plane. Spherical caps may also be described mathematically as spherical domes. In some embodiments, the first cap actuator and the second cap actuator of a controller may be of a size and position to represent opposing spherical caps of a single sphere, thus, when arranged in the casing, forming a virtual sphere (or ball) as perceived by a user of the controller. In some embodiments, a portion of the virtual sphere is contained within the controller casing, and is not required to have a spherical shape.

In some embodiments, the first cap actuator and second cap actuator of a controller form a virtual sphere at a location that may simultaneously be controlled by the thumb and fingers of a hand of a user. In some embodiments, the first cap actuator and second cap actuator are located to be accessible to a user from directions exterior to the first and second surfaces. For example, the virtual sphere may be installed in a location in or on a casing where the virtual sphere may be grasped between the thumb and forefinger or other finger of the user. In an example, a controller utilizing a casing that is substantially vertical may include a first cap actuator partially within or on a surface of a first side of the casing that is closer to (or facing) a user and a second cap actuator partially within or on a surface of a second side of the casing that is further away from (or facing away from) the user, such that the user may manipulate the first cap with a thumb and may manipulate the second cap with a forefinger or other finger of the same hand. In this matter, the user may manipulate the virtual sphere of a controller is a similar manner as the handling of a suspended ball of marble size. In some embodiments, manipulation of the controller provides six degrees of freedom, the six degrees of freedom being translation along x, y, and z-axes and rotation about the x, y, and z axes. As used herein, the y-axis generally lies in a plane parallel to the surface of the casing and is in an up-down orientation in the view of the user; the x-axis generally lies in the plane parallel to the surface of the casing and is in a left-right orientation in the view of the user; and the z-axis is generally perpendicular to the surface of the casing and is oriented along a line through a center of each of the caps of the controller. However, embodiments are not limited to this particular axis alignment. In certain embodiments, a controller that includes cap actuators that are installed on a surface of a casing of an apparatus may provide five degrees of freedom, where rotation around a z-axis is not provided or is provided by a separate control input.

In some embodiments, the two cap actuators and associated force sensing resistors provide an "embedded sphere" (or spheroid) that serves as a multi-axis controller. In some embodiments, six degrees of freedom are provided:

(1) Sway: Translating the sphere left or right in a plane parallel to the surface of the casing (along the x-axis);

(2) Heave: Translating the sphere up or down in a plane parallel to the surface of the casing (along the y-axis);

(3) Thrust: Translating the sphere inward or outward perpendicular to the surfaces of the casing (along the z-axis);

(4) Pitch: Rotating the sphere about the sway axis (the x-axis);

(5) Yaw: Rotating the sphere about the heave axis (the y-axis); and (6) Roll: Rotating the sphere about the thrust axis (the z-axis).

In some embodiments, each cap actuator of a controller is mounted adjacent to a sensor to sense force on the cap actuator, such as a force-sensing resistor. In some embodiments, the force-sensing resistor may include a conductive polymer that changes resistance upon application of force to its surface. In some embodiments, forces on the force-sensing resistor are interpreted as control inputs on the controller. In some embodiments, a cap actuator of a controller may include protrusions to provide force on the force-sensing resistor in response to control inputs to the controller provided by a user. In some embodiments, the shape of the rounded control surface operates to ensure that a force applied to a side of the cap actuator by a user results in a portion of the force being applied laterally to the sensor beneath the cap actuator, thus allowing a measurement of such force by the sensor. In some embodiments, resistive measurements may be acquired from four radial sectors (quadrants) symmetrically disposed about the z-axis). As the user deflects a spherical cap from an axially aligned rest position, the protrusion below the cap applies force to one or more of the quadrants. In some embodiments, measuring the relative force applied to the four quadrants allows the sensor to characterize the user input along the three translational and two rotational axes. However, embodiments are not limited to sensors that are divided into quadrants, and may includes sensors that otherwise provide sensitivity to resolve the amplitude and direction of forces applied to the cap actuators.

In some embodiments, input for rotation around the z-axis (roll) is resolved by an additional sensing mechanism. In a first embodiment, the additional sensing mechanism may comprise a ring encoder (e.g., an optical encoder) fixed to a cylindrical housing to which the hemispherical caps are coupled. In a second embodiment, the additional sensing mechanism may include an additional force-sensing resistor impinged upon by a protrusion, which may be referred to herein as a "hammer", that extends radially outward from one or both of the caps. The additional force-sensing resistor may be referred to as a roll-sensing resistor. In some embodiments, a rolling force in either direction (clockwise or counterclockwise) on one or both of the caps of the controller results in the hammer providing force on the rotational force-sensing resistor.

In some embodiments, a controller may provide additional control inputs using the cap actuators of the controller. In some embodiments, an alternate command input may be provided by squeezing the first cap actuator and second cap actuators together, providing an inward force on both the first cap actuator and the second cap actuator simultaneously. In some embodiments, the input may be interpreted as a squeezing operation if an average force on the first cap actuator and an average force on a second cap actuator are both above a certain threshold. In a first example, the squeezing of the first and second cap actuators may represent a start command for an application. In a second example, the squeezing of the first and second cap actuators may represent a grasping motion in a 3D control operation. In third example, the squeezing operation may represent a firing mechanism or other control in a video game application. In a fourth example, the squeezing operation could represent a "select" or "enter" input, or other similar operation. However, embodiments are not limited to these particular alternate command examples.

In some embodiments, a system or apparatus may include multiple controllers, such as a first controller for a left hand control input and a second controller for a right hand input. In some embodiments, the first and second controllers may included in a common control unit, such as, for example, placement of the first controller on a left side of a casing of a laptop computer and placement of the second controller on a right side of the casing of the laptop computer. In some embodiments, the first and second controllers may be operated as alternative controllers, or may be operated in a related or coordinated fashion. In one example, the first controller may provide a left hand controller in a 3D control operation, which the second controller may provide a right hand controller in the 3D control operation. In some embodiments, a position of the cap actuators of each controller is adjustable to allow a user to set a position of the controller at a preferred location for the user.

Figure 4:
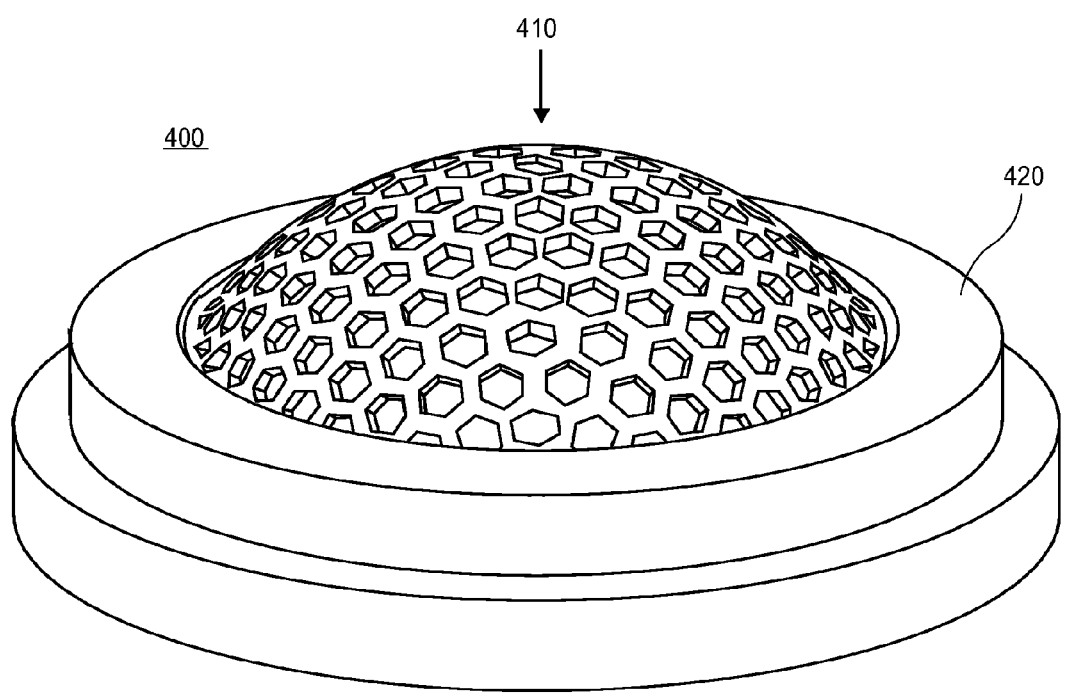
FIG. 4 is an illustration of an embodiment of a cap actuator for a 3D controller.

In some embodiments, the cap actuators may be composed of any material that allows a user to easily and naturally manipulate the controller, including silicon rubber (as well as plastic, rubber, or other material). In some embodiments, the cap actuators of a controller include a texture to provide friction and allow better control by the user. In some embodiments, the texture is a stretched hexagonal array, providing a texture that resembles a raised, stretched netting for a user of the controller. The texture of an embodiment of a cap actuator is illustrated in FIG. 4, as described below.

The small form factor and low profile of the UniBall controller may be utilized to also provide an aesthetically pleasing integration into or on the surface of a display casing (or other locations) on the laptop computer. In some embodiments, a first controller is provided on a left side of the laptop computer casing and a second controller is provided on a right side of the laptop computer casing to allow for optional left-handed, right-handed, or two-handed (simultaneous) operation. The degrees of freedom input from a marble-sized, tactile controller in a laptop computer may be used to provide rapid, precise, and intuitive manipulation of objects in a 3D environment or enhanced cursor control, web browsing, and gaming.

In some embodiments, a 3D controller or a set of multiple 3D controllers may be utilized by a user to, for example:

(1) Freely control the position and orientation of objects in a 3D world.

(2) Provide a handheld control for a pan tilt head for a camera, including zoom operation.

(3) Provide control for a device such as a remote helicopter or unmanned aerial vehicle (UAV), or remotely operated vehicle (ROV);

(4) Provide virtual body and hands telemetry, where the two virtual spheres of a first controller and a second controller control the equivalent of two end effectors, such as virtual hands or robotic hands, that give the user supination and pronation, as well as forward, back, up down, left, right, and combinations of hand movement. In a particular example, when the "hand" reach the extent of their bounding areas, the "body" attached to the "hands and arms" can move the body, thus meaning that the user has full arm and body telemetry without being encumbered by traditional telemetry suits that are exoskeleton in nature. In some embodiments, other inputs may provide for related operations, the inputs including the squeezing of the cap actuators to provide an alternate command and/or buttons on back of a device. In some embodiments, the other inputs may be used for grabbing, for activating a virtual or real tool, or other related actions. In some embodiments, the 3D controllers may thus be utilized to the user's experience augmented reality or telemetry control of their hands and core body without being strapped into a telemetry suit.

(5) Provide ability to a user to sculpt, assemble, weld and de-weld, and otherwise build and deconstruct objects.

(6) Provide social functions for a user, such as to shake virtual hands.

(7) Examine articles, including turning and repositioning the articles as necessary.

However, the above list contains only certain examples, and does not describe all possible uses of an embodiment of a 3D controller or set of 3D controllers.

In some embodiments, the 3D controller provides full degree of freedom control—translation along the x, y, and z-axes (sway, heave, and thrust) and rotation about the x-, y-, and z-axes (pitch, yaw, and roll). In other embodiments, the 3D controller may provide five degrees of freedom, where in some embodiments rotation about the z-axis is provided by a separate control input. In some embodiments, the input device may integrate additional controls beyond the degrees of freedom control. In some embodiments, the controller provides an interaction method and apparatus that is particularly suited for navigation in 3D computing environments. However, embodiments are not limited to 3D environments, and may be utilized in other types of computer environments in which in which multiple controls are needed or useful. In operation, a user may utilize a spherical 3D controller to easily control pitch and yaw to move through a virtual space with intuitive ease. For example, the 3D controller can be used, for example, to "fly" a rendering viewpoint (the camera eye) through a virtual world. The controller might also be utilized for control of traditional 2D cursor movements.

FIG. 1 is an illustration of an embodiment of a 3D controller for a computing apparatus or system. In some embodiments, a controller device includes two spherical cap actuators, each mounted above a force-sensing resistor, on opposing faces of the portable electronic device. The caps of the cap actuators are axially aligned, with the planes sectioning the spheres defined by the caps being parallel to one another. In some embodiments, the sectioning planes are also parallel to the opposing surfaces of the casing of the computing apparatus or system. In some embodiments, the sectioning planes are offset from one another such that the two spheres defined by the spherical caps are coincident, forming a single virtual sphere. Thus, to a user pinching the two caps between a finger and thumb, the caps may appear to be a single sphere centered within the thickness of the intervening electronic device. The concept may be generalized to any spherical interface in a resilient mounting for which applied force can be measured.

FIG. 1 provides a simplified drawing for illustration that is not intended to be to scale or to show all possible elements of a controller. In FIG. 1, a controller 100 includes a first cap actuator 110 and an opposing second cap actuator 115, where each of the first and second cap actuators includes a spherical cap portion. In some embodiments, the first cap actuator 110 is on or within a first surface 120 of a casing enclosing the controller 100, and the second cap actuator 115 is on or within a second surface 125 of the casing of the controller 100. In some embodiments, the spherical portion of the first cap actuator 110 protrudes at least in part beyond the first surface 120 of the casing, and the spherical portion of the second cap actuator 115 protrudes at least in part beyond the second surface 125 of the casing. FIG. 1 illustrates an embodiment in which the control actuators 110-115 and sensors 130-135 are installed partially within the casing. However, in some embodiments, the control actuators and sensors are installed on the first surface 120 and second surface 125. In some embodiments, the first cap actuator 110 and the second cap actuator 115 are of a shape and position so as to define a virtual sphere (or spheroid) in the controller. In some embodiments, the hammer 140 includes a yoke or other portion 142 that encircles the z-axis, and that may be captured between the bases of the two caps. In some embodiments, the cap actuators 110-115 are mounted on a track integrated within or on the surface of the casing, allowing a user to adjust the position of the devices to the desired location.

In some embodiments, extending from the inward facing surface of each cap actuator is a protrusion aligned on the axis of the cap. In some embodiments, an axial length of the protrusion is such that it contacts the surface of the force-sensing resistor when the cap is mounted on the exterior of, for example, a portable electronic device. Each cap thus serves as a force actuator, relaying a user's force on the cap to the force-sensing resistor. Preferably, the cap and the protrusion are made from a compliant material that ensures reliable contact between the protrusion and the force-sensing resistor. Additionally, the hemispherical caps may have an additional, smaller protrusion or indentation on the exterior surface. This protrusion or indentation aids the user in tactilely locating the common axis of alignment of the two caps (which is referred to herein as the z-axis).

In some embodiments, the controller includes a first force sensor (which may be referred to as S1) 130 to detect force on the first cap actuator 110 and a second force sensor (S2) 135 to detect force on the second cap actuator 115, where the first force sensor 130 and the second force sensor include force sensing resistors.

In some embodiments, the controller 100 includes an element to detect a rolling force (about the z-axis) on one or more of the cap actuators 110-115. In a first embodiment, a cap actuator may include a ring encoder (e.g., an optical encoder) fixed to a cylindrical housing to which the caps are coupled. In this implementation, the caps may be rotated in unison about the axis of alignment (the z-axis) to provide a sixth degree of freedom input. This degree of freedom may control, for example, the roll input about the z-axis in the interface.

In a second embodiment, the roll input of the controller is resolved using a sensor such an additional force-sensing resistor impinged upon by a "hammer" that extends radially outward from one or both of the cap actuators. In the illustration provided in FIG. 1, the controller 100 includes one or more rotational sensors to detect a rotational force (rolling force) of one or both of the first cap actuator 110 and the second cap actuator 115 around the common axis 150 through the actuators (the z-axis). In some embodiments, one or both of the cap actuators may include an extension (hammer) 140 to translate rotational movement to a force on one or more sensors 145, which may, for example, include a first sensor (P1) to detect a rotational force (torque) in a first direction (for example, clockwise around the z-axis from a perspective of a first side of the controller) and a second sensor (P2) to detect a rotational force in a second direction (for example, counterclockwise around the z-axis from the perspective of the first side of the controller). In some embodiments, the hammer 140 includes a yoke portion 142 that encircles the z-axis, and is captured between the bases of the two caps actuators. FIG. 1 illustrates an embodiment in which a hammer portion is contained within the casing for the cap actuators 110-115. In some embodiments, in which the first cap actuator 110 and first sensor 130 are installed on the first surface and the second cap actuator 115 and second sensor 135 are installed on the second surface, the first cap actuator 110 may include a first hammer or set of hammers in a cover outside the first surface 120 and the second cap actuator 115 includes a second hammer or set of hammers in a cover outside the second surface 125.

In some embodiments, a controller receives input from the following sensors:

(a) Two sensors (referred to as S1 and S2), reporting a scalar measurement of the force applied in each of four planar quadrants parallel to the surface on which the virtual sphere, composed of the first and second spherical caps, is mounted. The planar quadrants may be referred to as $S_n^N, S_n^S, S_n^E, S_n^W$, to indicate force on a North (upper) quadrant, a South (lower) quadrant, a West (left) quadrant, and an East (right) quadrant relative to a first side of the controller, for each of the first side (n=1) and the second side (n=2) of the controller.

(b) Two sensors (referred to herein as P1 and P2) reporting a scalar measurement of force provided by the hammer or hammers as the virtual sphere rotates about the z-axis.

In some embodiments, the equations below summarize the mapping of the sensor readings onto the six-degree-of-freedom movement of the controlled object, the controlled object being the physical or virtual object under the command of the controller. Specifically, the equations map the sensor inputs onto translation (T) along and rotation (R) about the x-, y-, and z-axes. For a vertically installed controller, the axes may generally be the x-axis running parallel to the casing along a side-to-side path, the y-axis running parallel to the casing along an up-down path, and the z-axis running perpendicular to the casing along a path passing through a center of each of the spherical caps. The mappings provided by the equations below are expressed as proportional relationships (denoted by the ∝ operator). A constant of proportionality may vary from one degree-of-freedom to another, allowing for individual adjustment of the input sensitivity for each degree of freedom.

$$T_X \propto \min(S_1^E, S_2^E) - \min(S_1^W, S_2^W) \qquad [1]$$

$$T_Y \propto \min(S_1^N, S_2^N) - \min(S_1^S, S_2^S) \qquad [2]$$

$$T_Z \propto \mathrm{avg}(S_1^N, S_1^S, S_1^E, S_1^W) - \mathrm{avg}(S_2^N, S_2^S, S_2^E, S_2^W) \qquad [3]$$

$$R_X \propto \min(S_1^N, S_2^S) - \min(S_1^S, S_2^N) \qquad [4]$$

$$R_Y \propto \min(S_1^E, S_2^W) - \min(S_1^W, S_2^E) \qquad [5]$$

$$R_Z \propto P_2 - P_1 \qquad [6]$$

Figure 2:
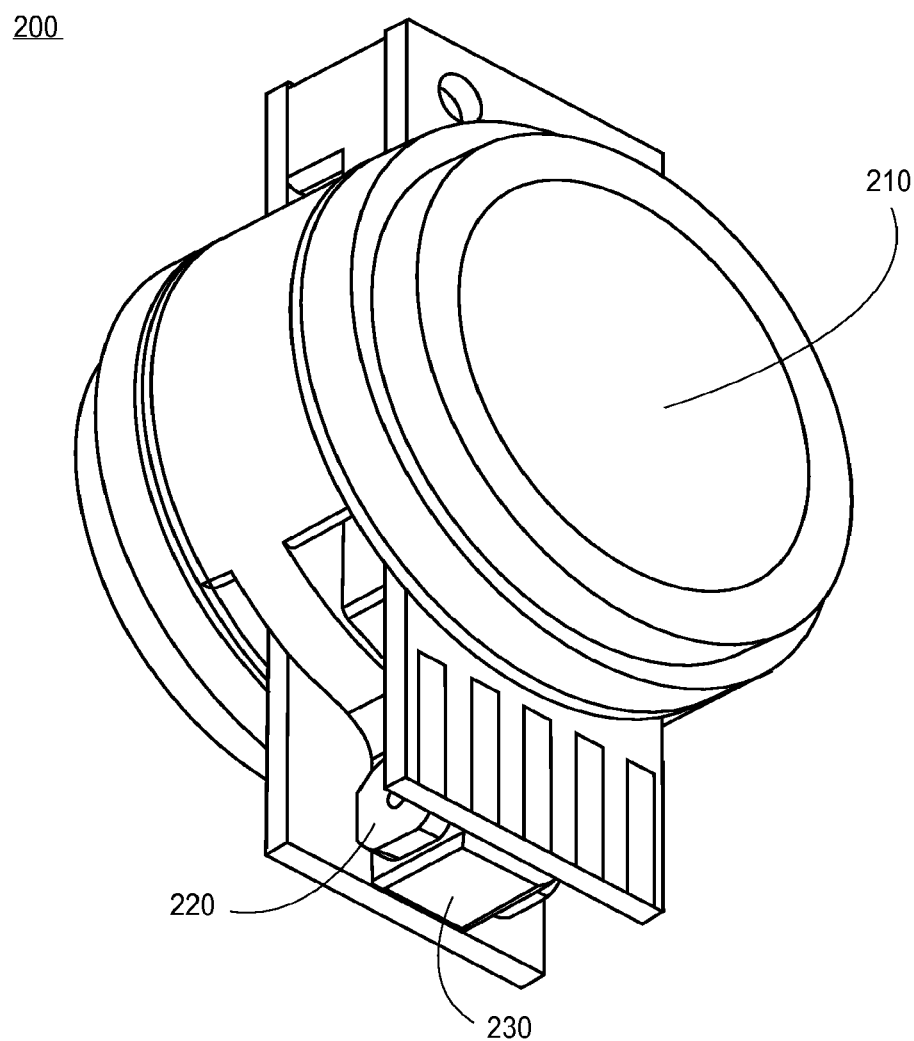
FIG. 2 is an illustration of an embodiment of a 3D controller with rolling force detection.

FIG. 2 is an illustration of an embodiment of a 3D controller with rolling force detection. In some embodiments, a controller 200 includes opposing cap actuators 210 that are coupled with a hammer 220 for each direction of rotation (clockwise and counterclockwise). In some embodiments, the hammer 220 translates rolling force to impinge on a sensor to measure the rolling force.

In other embodiments, the opposing cap actuators may be separate for installation on opposing surfaces of a casing. In some embodiments, the separate cap actuators may include a separate hammer or set of hammers and a separate sensor or sensors to translate rolling force on each cap actuator to impinge on separate sensors to measure the rolling force.

Figure 3:
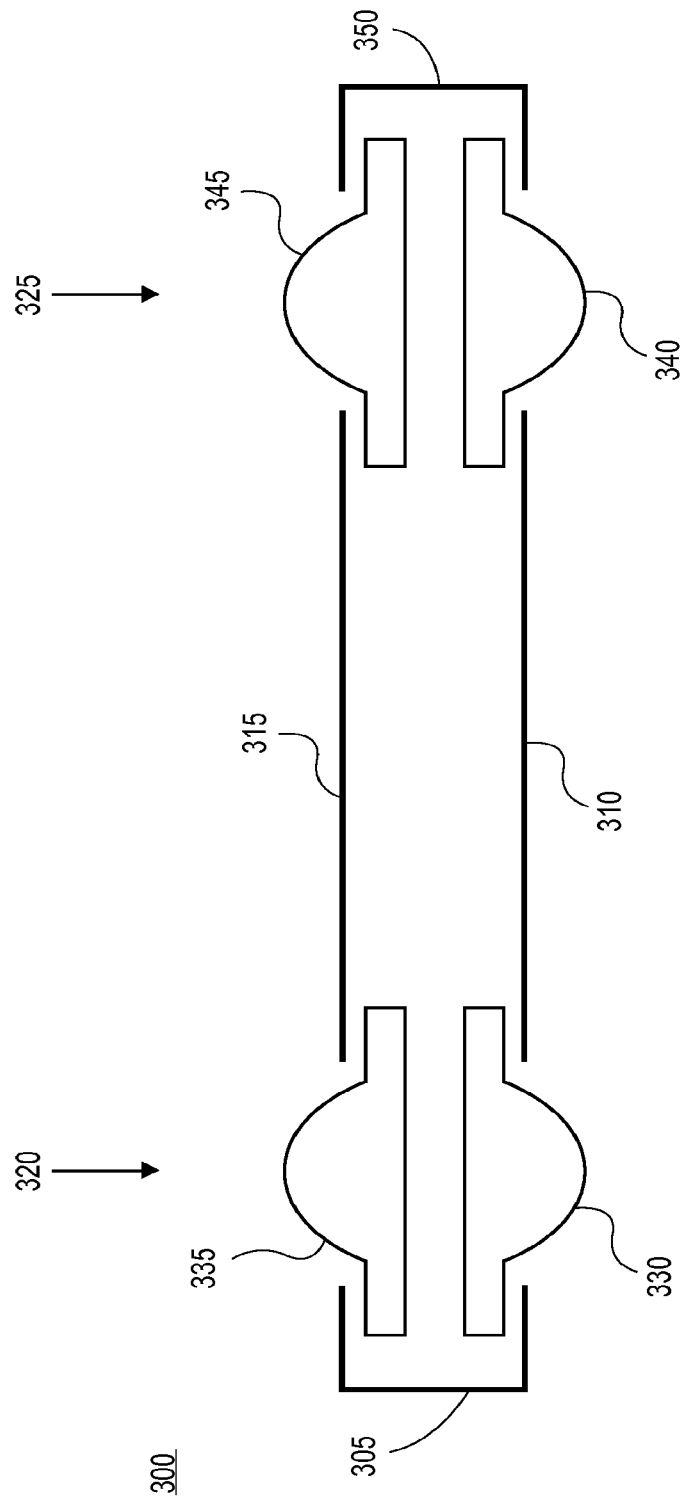
FIG. 3 is an illustration of an embodiment of a set of 3D controllers in a casing of an apparatus or system.

FIG. 3 is an illustration of an embodiment of a set of 3D controllers in a casing of an apparatus or system. The illustration of FIG. 3 is a simplified illustration of controllers in an apparatus or system as viewed from above the apparatus or system. In some embodiments, an apparatus or system 300 includes a casing 305 having a first side 310 and a second side 315, where, for example, the first side 310 may be a side facing a user and the second side 315 may be a side facing away from the user.

In some embodiments, the casing includes a first 3D controller 320 and a second 3D controller 325. In the illustration provided in FIG. 3, the first controller 320 would be a left controller for a user of the apparatus or system 300, and the second controller 325 would be a right controller for the user. The first controller 320 includes a first set of two aligned cap actuators, a first cap actuator 330 at least partially extending past the first side 310 of the casing 305, and a cap second actuator 335 at least partially extending past the second side 315 of the casing 305. The second controller 325 includes a set of two aligned cap actuators, a third cap actuator 340 at least partially extending past the first side 310 of the casing 305, and a fourth cap actuator 345 at least partially extending past the second side 315 of the casing 305.

In some embodiments, the first controller 320 and the second controller 325 may be used separately, providing a choice for a user either to operate the first cap actuator 330 and second cap actuator 335 of the first controller 320 with the user's left hand, or to operate the third cap actuator 340 and fourth cap actuator 345 of the second controller 325 with the user's right hand, or to operate both the first and second controllers simultaneously depending on, for example, the capabilities of the apparatus or system 300 or the functions of an application being run on the apparatus or system 300.

FIG. 3 illustrates an embodiment in which the cap actuators are installed partially within the casing 350. In some embodiments, the cap actuators are instead installed on the surfaces of the casing. In some embodiments, the cap actuators are mixed, with one or more of the cap actuators being installed partially within the cases and one or more of the cap actuators being installed on the surfaces of the casing 350.

FIG. 4 is an illustration of an embodiment of a cap actuator for a 3D controller. In some embodiments, a cap actuator 400 includes a spherical control surface portion 410 and a circular base portion 420. In some embodiments, the control surface 410 includes a texture to provide friction and allow better control by the user. In some embodiments, the texture is a stretched hexagonal array, as illustrated in the control surface 410 in FIG. 4.

Figure 5:
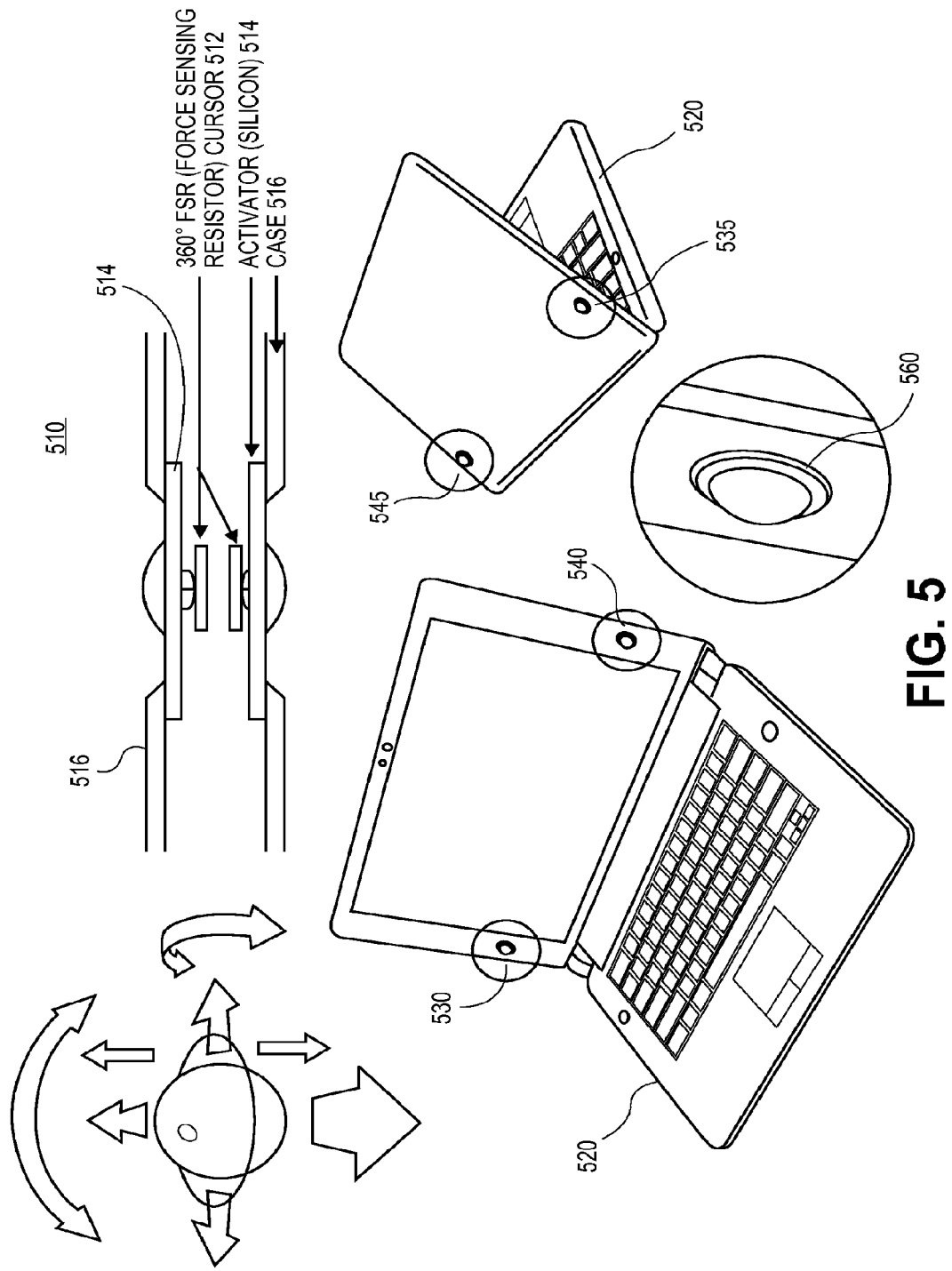
FIG. 5 is an illustration of an embodiment of a 3D controller installed in a laptop computer.

FIG. 5 is an illustration of an embodiment of a 3D controller installed in a laptop computer. In some embodiments, a 3D controller includes a virtual sphere 500 providing six degrees of freedom. The controller 510 is illustrated as including two cap actuators 514 that extend at least partially beyond the surface of a casing 516, such cap actuators being installed partially within the surface of the casing or on the surface of the casing 516, wherein each actuator 514 translates force to a force sensing resistor 512 and to an additional sensor (not shown) to resolve each of the six degrees of freedom.

In the illustration provided in FIG. 5, a laptop computer 520 may include two 3D controllers, where a first controller includes a first cap actuator 530 extending beyond a front surface of a left side of the casing of the laptop computer 520, and an aligned second cap actuator 535 extending beyond a back surface of the casing. Further, a second controller includes a third cap actuator 540 extending beyond a front surface of a right side of the casing of the laptop computer 520, and an aligned fourth cap actuator 545 extending beyond a back surface of the casing. Also illustrated is a closer image of a cap actuator 560 of a 3D controller of the laptop computer.

Figure 6:
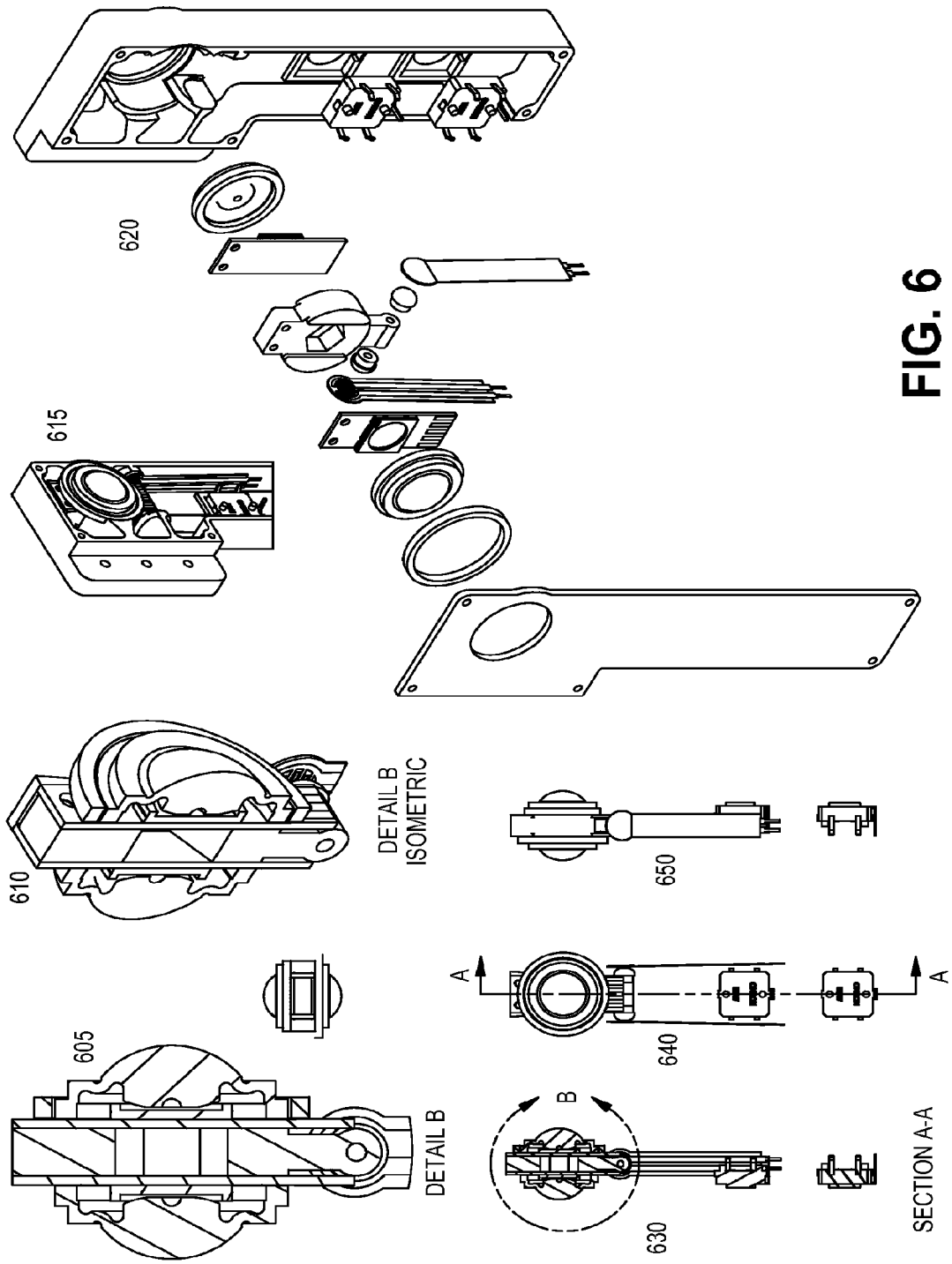
FIG. 6 is an illustration of views of an embodiment of a 3D controller.

FIG. 6 is an illustration of views of an embodiment of a 3D controller. In this illustration, the following views are provided:

(a) A side view of a 3D controller unit 605, including the aligned cap actuators above force sensing resistors, and including a hammer to impact an additional sensor.
(b) An isometric cut away view of a 3D controller 610.
(c) An isometric view of a 3D controller and cover 615.
(d) An exploded view of elements of a 3D controller and cover 620.
(e) A side view of a 3D controller and additional control input 630.
(f) A facing view of a 3D controller and additional control inputs. 640.
(g) A side view of a 3D controller and addition control input 650.

Figure 7:
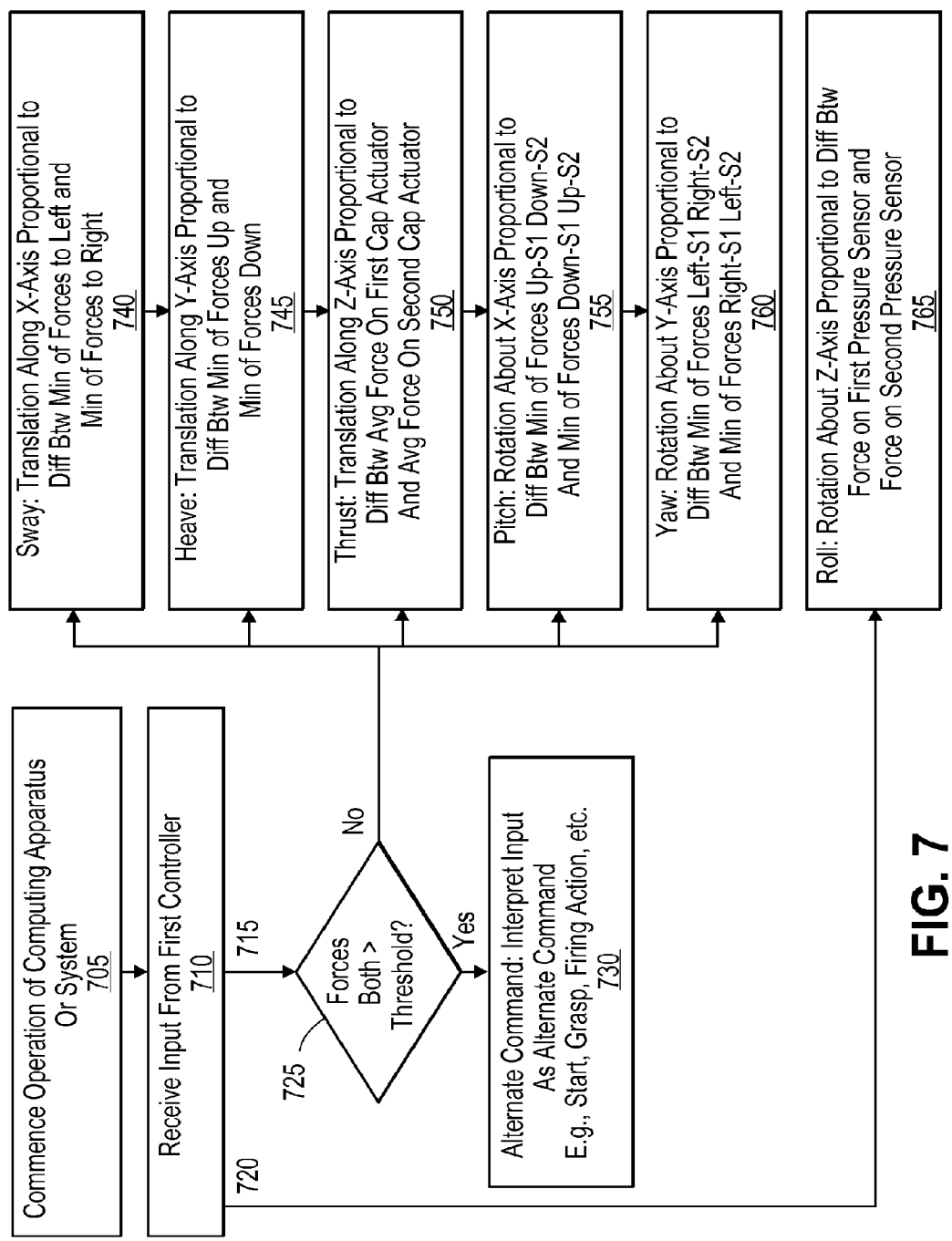
FIG. 7 is a flowchart to illustrate an embodiment of a process for three-dimensional control of a computing system.

FIG. 7 is a flowchart to illustrate an embodiment of a process for three-dimensional control of a computing system. In the illustrated process shown in FIG. 7, operation of a computing apparatus or system is commenced 705, where the computing apparatus or system includes one or more 3D controllers, where the one or more controllers may be controllers as illustrated in FIGS. 1-6 or as described above. In the process, an input is received from a first controller 710, where in some embodiments the first controller includes one or more sensors to detect force on a first cap actuator of the first controller and one or more sensors to detect force on a second cap actuator of the first controller, and includes one or more sensors to detect a rotational (rolling) force for the cap actuators.

In some embodiments, for the component of forces into one or both of the cap actuators (lateral force) 715 where the average forces on the first cap actuator and the second cap actuator are not both above a certain threshold 725, the input is interpreted as a translation along the x, y, or z-axes or a rotation around the x or y-axes as follows:

A translation along the x-axis (Sway) is proportional to a difference between a minimum of the forces on the left actuator quadrant and a minimum of the forces on the right actuator quadrant 740, such as expressed in Equation [1].

A translation along the y-axis (Heave) is proportional to a difference between a minimum of the forces on the upper actuator quadrant and a minimum of the forces on the lower actuator quadrant 745, such as expressed in Equation [2].

A translation along the z-axis (Thrust) is proportional to a difference between the average forces across the quadrants of a first force sensing resistor beneath the first cap actuator and the average forces across the quadrants of a second force sensing resistor beneath the second cap actuator 750, such as expressed in Equation [3].

A rotation about the x-axis (Pitch) is proportional to a difference between a minimum of the upper quadrant of the first actuator (referred to in FIG. 7 as Up-S1) and the lower quadrant of the second actuator (Down-S2), and a minimum of the lower quadrant of the first actuator (Down-S1) and the upper quadrant of the second actuator (Up-S2) 755, such as expressed in Equation [4].

A rotation about the y-axis (Yaw) is proportional to a difference between a minimum of the left quadrant of the first actuator (referred to in FIG. 7 as Left-S1) and the right quadrant of the second actuator (Right-S2), and a minimum of the right quadrant of the first actuator (Right-S1) and the left quadrant of the second actuator (Left-S2) 760, such as expressed in Equation [5]. In some embodiments, for rotational force about the z-axis (Roll) 715, a rotation about the z-axis is determined to be proportional a difference between a force on a first sensor (P1) and force on a second sensor (P2) 720, such as expressed in Equation [6].

In some embodiments, for the component of forces into one or both of the cap actuators (lateral force) 715, if the average forces on the first cap actuator and the average forces on the second cap actuator are both above a certain threshold 725, indicating a squeezing input on the controller, then the input may be interpreted as an alternate command 765, where the alternate command for a particular use or application might be, for example, a start command, a grasp command, a firing command, or other alternate command.

In some embodiments, a system may further provide that engaging the alternate command by the squeezing input on the controller will prevent the simultaneous input of any of the degrees of freedom, including roll input 765, and thus allowing an apparatus or system to ignore accidental inputs that are made while attempting to provide the squeezing input for an alternate command.

Figure 8:
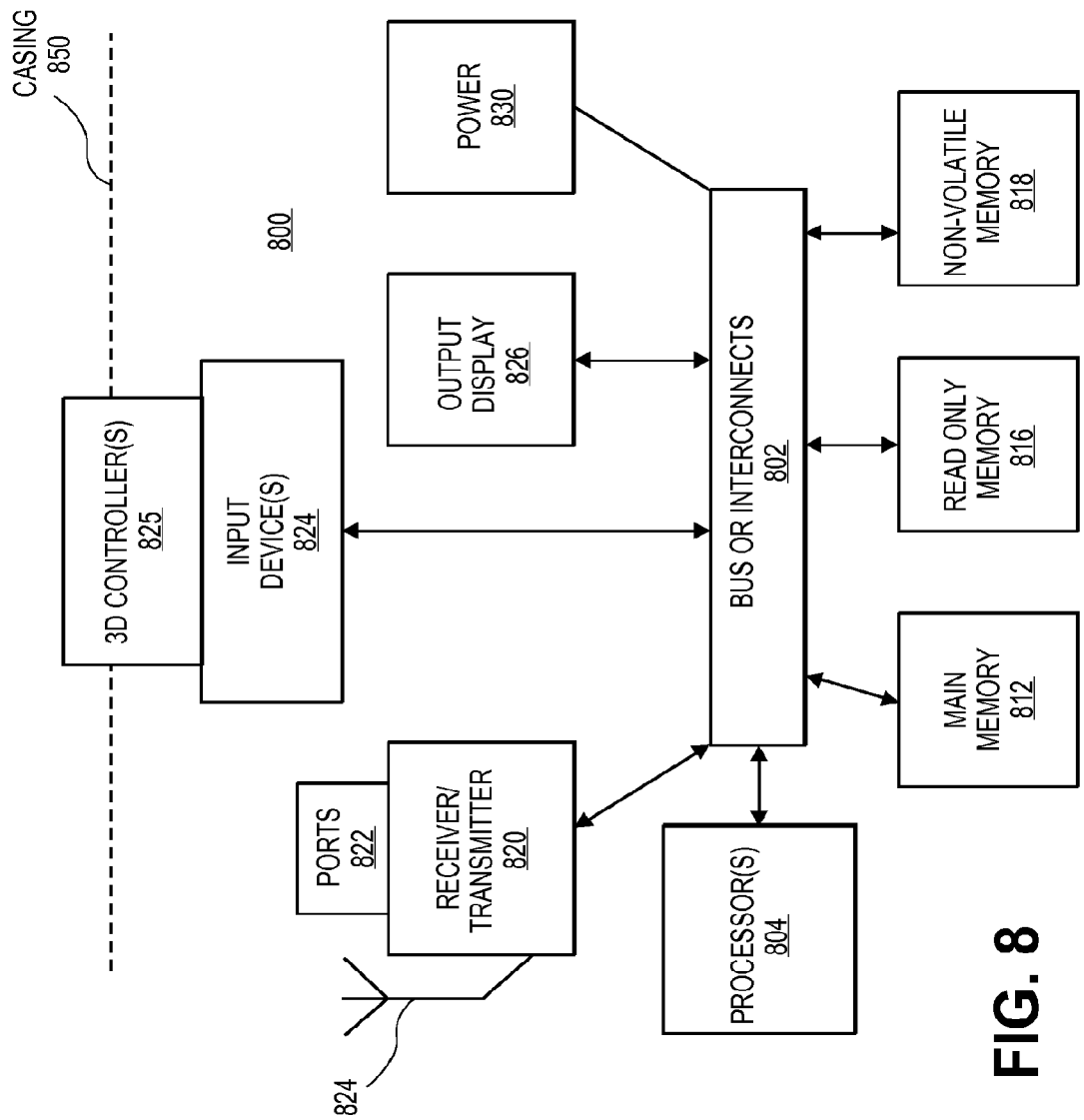
FIG. 8 illustrates an embodiment of a computing device or system including 3D control.

FIG. 8 illustrates an embodiment of a computing apparatus or system including 3D control. The computing apparatus or system (referred to generally here as a computing system) may include a computer, including for example a laptop or netbook computer or desktop computer; a server; a game console or handheld game apparatus; a handheld computer; a tablet computer; a smart phone; or other computing apparatus or system. In this illustration, certain standard and well-known components that are not germane to the present description are not shown. Under some embodiments, the computing system 800 comprises an interconnect or crossbar 802 or other communication means for transmission of data. The computing system 800 may include a processing means such as one or more processors 804 coupled with the interconnect 802 for processing information. The processors 804 may comprise one or more physical processors and one or more logical processors. The interconnect 802 is illustrated as a single interconnect for simplicity, but may represent multiple different interconnects or buses and the component connections to such interconnects may vary. The interconnect 802 shown in FIG. 8 is an abstraction that represents any one or more separate physical buses, point-to-point connections, or both connected by appropriate bridges, adapters, or controllers.

In some embodiments, the computing system 800 further comprises a random access memory (RAM) or other dynamic storage device or element as a main memory 812 for storing information and instructions to be executed by the processors 804, including information regarding inputs from one or more input devices. RAM memory includes dynamic random access memory (DRAM), which requires refreshing of memory contents, and static random access memory (SRAM), which does not require refreshing contents, but at increased cost. In some embodiments, main memory may include active storage of applications including a browser application for using in network browsing activities by a user of the computing system. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory.

The computing system 800 also may comprise a read only memory (ROM) 816 or other static storage device for storing static information and instructions for the processors 804. The computing system 800 may include one or more non-volatile memory elements 818, such as flash memory, for the storage of certain elements.

One or more transmitters or receivers 820 may also be coupled to the interconnect 802. In some embodiments, the computing system 800 may include one or more ports 822 for the reception or transmission of data. The computing system 800 may further include one or more omnidirectional or directional antennas 824 for the reception of data via radio signals.

In some embodiments, the computing system 800 includes one or more input devices 824, where the input devices include one or more of a keyboard, mouse, touch pad, voice command recognition, gesture recognition, or other device for providing an input to a computing system. In some embodiments, the input devices 824 include one or more 3D controllers 825, including controllers illustrated in FIGS. 1-6 or described above providing a virtual sphere including a first cap actuator and a second cap actuator that are disposed at least partially beyond surfaces of a casing 850. In some embodiments, the computing system is a single unit, such as a laptop computer or tablet computer, and the cap actuators of the one or more 3D controllers are installed partially within or on the surface of the casing 850 and extend on either side of the system casing 850, such as the illustrated front cap actuators 530 and 540 and back cap actuators 535 and 545 for the controllers of laptop computer 520 illustrated in FIG. 5. In some embodiments, the computing system 800 includes multiple separate units, including, for example, a separate controller unit, and the cap actuators extend at least partially beyond the surfaces of the casing of the separate controller unit.

The computing system 800 may also be coupled via the interconnect 802 to an output display 826. In some embodiments, the display 826 may include a liquid crystal display (LCD) or any other display technology, for displaying information or content to a user. In some environments, the display 826 may include a touch-screen that is also utilized as at least a part of an input device. In some environments, the display 826 may be or may include an audio device, such as a speaker for providing audio information. In some embodiments, one or more 3D controllers 825 may be adjacent to the output display 826, including for example a first controller located on a first side of a display and a second controller located on an opposite second side of the display.

The computing system 800 may also comprise a power device or system 830, which may comprise a power supply, a battery, a solar cell, a fuel cell, or other system or device for providing or generating power. The power provided by the power device or system 830 may be distributed as required to elements of the computing system 800.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments of the present invention may be provided as a computer program product, which may include a computer-readable medium having stored thereon computer program instructions, which may be used to program a computer (or other electronic devices) for execution by one or more processors to perform a process according to the embodiments of the present invention. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

In some embodiments, an apparatus includes a casing, the casing including a first surface and a second surface, the first surface being opposite to the second surface; and a 3D controller including: a first cap actuator, the first cap actuator including a first rounded control surface, at least a portion of the first rounded control surface extending beyond the first surface of the casing; a second cap actuator, the second cap actuator including a second rounded control surface, at least a portion of the second rounded control surface extending beyond the second surface of the casing, the first rounded control surface being aligned with the second rounded control surface; a first sensor to detect force on the first actuator; a second sensor to detect force on the second actuator; and a third sensor to detect a rotational force about one or both of the first actuator and the second actuator.

In some embodiments, the 3D controller further includes a third sensor to detect a rotational force about one or both of the first cap actuator and the second cap actuator. In some embodiments, at least one of first cap actuator and the second cap actuator includes an extension to provide force on the third sensor. In some embodiments, the 3D controller of the apparatus provides input for six degrees of freedom. In some embodiments, the first sensor and the second sensor provide input for five of the six degrees of freedom, wherein the five of six degrees of freedom are translation about a first axis being a first degree of freedom, translation about a second axis being a second degree of freedom, translation about a third axis being a third degree of freedom, rotation about the first axis being a fourth degree of freedom, and rotation about the second axis being a fifth degree of freedom. In some embodiments, the third sensor provides input for a sixth degree of freedom, the sixth degree of freedom being a rotation about the third axis.

In some embodiments, the first axis and the second axis are parallel to the first surface and second surface of the casing, and the third axis is perpendicular to the first surface and second surface of the casing and passes through a center of the first cap actuator and the second cap actuator.

In some embodiments, wherein a force on the first cap actuator and a force on the second cap actuator of the apparatus that are both above a certain threshold generates an alternate command to the six degrees of freedom.

In some embodiments, the first rounded control surface and the second rounded control surface of the apparatus are shaped as spherical caps. In some embodiments, the first rounded control surface and the second rounded control surface form portions of a virtual sphere.

In some embodiments, the first sensor and the second sensor are force-sensing resistors, and in some embodiments wherein the first actuator and the second actuator include protrusions to provide force on the first sensor and the second sensor. In some embodiments, at least one of first cap actuator and the second actuator includes an extension to provide force on the third sensor. In some embodiments, the first cap actuator is partially within the casing or is on the first surface, and wherein the second cap actuator is partially within the casing or is on the second surface.

In some embodiments, an apparatus includes a casing, the casing including a first surface and a second surface, the first surface being opposite to the second surface; and a three-dimensional (3D) controller including: a first actuator partially within or on the first surface, the first actuator located in a position accessible to a hand of a user; a second actuator partially within or on the second surface, the second actuator located in a position accessible to the hand of the user; a first sensor to detect force on the first actuator; and a second sensor to detect force on the second actuator. In some embodiments, the 3D controller provides input for six degrees of freedom, wherein the six degrees of freedom are translation about a first axis being a first degree of freedom, translation about a second axis being a second degree of freedom, translation about a third axis being a third degree of freedom, rotation about the first axis being a fourth degree of freedom, rotation about the second axis being a fifth degree of freedom, rotation about third axis being a sixth degree of freedom.

In some embodiments, a method includes: detecting a force on one or more of a first actuator of a control apparatus and a second actuator of the control apparatus, wherein detecting the force includes detection of one or more of a force on one or more of a plurality of sectors of first sensor for the a first actuator, a force on one or more of a plurality of sectors of a second sensor for the second actuator, and a rotational force about one or both of the first actuator and the second actuator; and interpreting the force as one of a plurality of inputs.

In some embodiments, the plurality of inputs for the method includes six degrees of freedom. In some embodiments, six degrees of freedom are translation about a first axis being a first degree of freedom, translation about a second axis being a second degree of freedom, translation about a third axis being a third degree of freedom, rotation about the first axis being a fourth degree of freedom, rotation about the second axis being a fifth degree of freedom, rotation about third axis being a sixth degree of freedom. In some embodiments, the force on the sectors of the first actuator and the force on the sectors of the second actuator provide input for the first, second, third, fourth, and fifth degrees of freedom, and in some embodiments the rotational force about one or both of the first actuator and the second actuator provide input for the sixth degree of freedom.

In some embodiments, the plurality of inputs for the method include an alternative input, further comprising interpreting the force as the alternate input if a force on the first actuator and a force on the second actuator are both above a certain threshold.

In some embodiments, a system includes: a processor to interpret commands; a dynamic random access memory (DRAM) to hold data including data from one or more input devices; a casing including a first surface and a second surface; and a three-dimensional (3D) controller. The 3D controller includes: a first cap actuator, the first cap actuator including a first rounded control surface, at least a portion of the first rounded control surface extending beyond the first surface of the casing; a second cap actuator, the second cap actuator including a second rounded control surface, at least a portion of the second rounded control surface extending beyond the second surface of the casing, the first rounded control surface being aligned with the second rounded control surface; a first sensor to detect force on the first cap actuator; and a second sensor to detect force on the second cap actuator;

In some embodiments, the 3D controller of the system further includes a third sensor to detect a rotational force about one or both of the first actuator and the second actuator.

In some embodiments, the system is a laptop computer, and wherein the casing includes a display casing holding a display. In some embodiments, the system further includes a second 3D controller, wherein the 3D controller is installed in a first side of the display casing and the second 3D controller is installed in an opposite second side of the display casing.

In some embodiments, first surface of the casing of the system is a surface that faces a user operating the system and wherein the second surface is a surface that faces away from a user operating the system.

In some embodiments, wherein the 3D controller of the system provides input for six degrees of freedom, wherein the six degrees of freedom are translation about a first axis being a first degree of freedom, translation about a second axis being a second degree of freedom, translation about a third axis being a third degree of freedom, rotation about the first axis being a fourth degree of freedom, rotation about the second axis being a fifth degree of freedom, rotation about third axis being a sixth degree of freedom.

In some embodiments, a computer-readable storage medium having stored thereon data representing sequences of instructions that, when executed by a processor, cause the processor to perform operations comprising: detecting a force on one or more of a first actuator of a control apparatus and a second actuator of the control apparatus, wherein detecting the force includes detection of one or more of: a force on one or more of a plurality of sectors of a first sensor of a first actuator, a force on one or more of a plurality of sectors of a second sensor for the second actuator, and a rotational force about one or both of the first actuator and the second actuator; and interpreting the force as one of a plurality of inputs.

In some embodiments, the plurality of inputs includes six degrees of freedom. In some embodiments, the six degrees of freedom are translation about a first axis being a first degree of freedom, translation about a second axis being a second degree of freedom, translation about a third axis being a third degree of freedom, rotation about the first axis being a fourth degree of freedom, rotation about the second axis being a fifth degree of freedom, rotation about third axis being a sixth degree of freedom.

The invention claimed is:

1. An apparatus comprising:
a casing, the casing including a first surface and a second surface, the first surface being opposite to the second surface; and
a three-dimensional (3D) controller including:
a first cap actuator, the first cap actuator including a first rounded control surface, at least a portion of the first rounded control surface extending beyond the first surface of the casing;
a second cap actuator, the second cap actuator including a second rounded control surface, at least a portion of the second rounded control surface extending beyond the second surface of the casing, the first rounded control surface being aligned with the second rounded control surface;
a first sensor to detect force on the first cap actuator applied to any of four quadrants of the first sensor;
a second sensor to detect force on the second cap actuator applied to any of four quadrants of the second sensor; and
a third sensor to detect a rotational force about the first cap actuator and a fourth sensor to detect a rotational force about the second cap actuator;
wherein the apparatus is to determine inputs for five of six degrees of freedom based on forces detected by the first sensor and the second sensor for the four quadrants of the first sensor and the second sensor, the five of six degrees of freedom being translation about a first axis parallel to the first surface and second surface, translation about a second axis parallel to the first surface and second surface and orthogonal to the first axis, translation about a third axis orthogonal to the first surface and the second surface and passing through a center of the first cap actuator and the second cap actuator, rotation about the first axis, and rotation about the second axis; and
wherein the apparatus is to determine input for a sixth degree of freedom based on rotational forces detected by the third sensor and the fourth sensor, the sixth degree of freedom being a rotation about the third axis.

2. The apparatus of claim 1, wherein the first cap actuator includes an extension to provide force on the third sensor and the second cap actuator includes an extension to provide force on the fourth sensor.

3. The apparatus of claim 1, wherein a force on the first cap actuator and a force on the second cap actuator that are both above a certain threshold further generates an alternate command.

4. The apparatus of claim 1, wherein the first rounded control surface and the second rounded control surface are shaped as spherical caps, the first rounded control surface and the second rounded control surface forming portions of a virtual sphere.

5. The apparatus of claim 1, wherein the first sensor and the second sensor are force-sensing resistors.

6. The apparatus of claim 5, wherein the first cap actuator and the second cap actuator include protrusions to provide force on each quadrant of the first sensor and the second sensor.

7. The apparatus of claim 1, wherein the first cap actuator is partially within the casing or is on the first surface, and wherein the second cap actuator is partially within the casing or is on the second surface.

8. The apparatus of claim 1, wherein the input for translation about the first axis or the second axis is proportional to a difference between:
a minimum of a first force detected on a first quadrant by the first sensor and a second force detected on the corresponding first quadrant by the second sensor; and
a minimum of a third force detected on a second quadrant by the first sensor and a fourth force detected on the corresponding second quadrant by the second sensor, the second quadrant being opposite to the first quadrant.

9. The apparatus of claim 1, wherein the input for rotation about the first axis or the second axis is proportional to a difference between:
a minimum of a first force detected on a first quadrant by the first sensor and a second force detected on a second quadrant by the second sensor, the second quadrant being opposite to the first quadrant; and a minimum of a third force detected on the second quadrant by the first sensor and a fourth force detected on the first quadrant by the second sensor.

10. The apparatus of claim 1, wherein the input for rotation about the third axis is proportional to a difference between:
an average of forces on each of the four quadrants detected by the first sensor; and
an average of forces on each of the four quadrants detected by the second sensor.

11. The apparatus of claim 1, wherein the input for rotation about the third axis is proportional to a difference between a first rotational force detected by the third sensor and a second rotational force detected by the fourth sensor.

12. A method comprising:
detecting forces on a first actuator of a control apparatus and a second actuator of the control apparatus, wherein detecting the force includes detection of one or more of:
forces on any of four quadrants of a first sensor for the first actuator,
forces on any of four quadrants of a second sensor for the second actuator, and
a rotational force about the first actuator detected by a third sensor and a rotational force about the second actuator detected by a fourth sensor; and interpreting the forces as one of a plurality of inputs including:
determining inputs for five of six degrees of freedom based on forces detected by the first sensor and the second sensor for the four quadrants of the first sensor and the second sensor, the five of six degrees of freedom being translation about a first axis parallel to the first surface and second surface, translation about a second axis parallel to the first surface and second surface and orthogonal to the first axis, translation about a third axis orthogonal to the first surface and the second surface and passing through a center of the first cap actuator and the second cap actuator, rotation about the first axis, and rotation about the second axis; and
determining an input for a sixth degree of freedom based on rotational forces detected by the third sensor and the fourth sensor, the sixth degree of freedom being a rotation about the third axis.

13. The method of claim 12, wherein the plurality of inputs includes an alternative input, further comprising interpreting the force as the alternate input if a force on the first actuator and a force on the second actuator are both above a certain threshold.

14. The method of claim 12, wherein the input for translation about the first axis or the second axis is proportional to a difference between:
a minimum of a first force detected on a first quadrant by the first sensor and a second force detected on the corresponding first quadrant by the second sensor; and
a minimum of a third force detected on a second quadrant by the first sensor and a fourth force detected on the corresponding second quadrant by the second sensor, the second quadrant being opposite to the first quadrant.

15. The method of claim 12, wherein the input for rotation about the first axis or the second axis is proportional to a difference between:
a minimum of a first force detected on a first quadrant by the first sensor and a second force detected on a second quadrant by the second sensor, the second quadrant being opposite to the first quadrant; and
a minimum of a third force detected on the second quadrant by the first sensor and a fourth force detected on the first quadrant by the second sensor.

16. The method of claim 12, wherein the input for rotation about the third axis is proportional to a difference between:
an average of forces on each of the four quadrants detected by the first sensor; and
an average of forces on each of the four quadrants detected by the second sensor.

17. The method of claim 12, wherein the input for rotation about the third axis is proportional to a difference between a first rotational force detected by the third sensor and a second rotational force detected by the fourth sensor.

18. A system comprising:
a processor to interpret commands;
a synchronous dynamic random access memory (SDRAM) to hold data including data from one or more input devices;
a casing including a first surface and a second surface; and
a three-dimensional (3D) controller including:
a first cap actuator, the first cap actuator including a first rounded control surface, at least a portion of the first rounded control surface extending beyond the first surface of the casing;
a second cap actuator, the second cap actuator including a second rounded control surface, at least a portion of the second rounded control surface extending beyond the second surface of the casing, the first rounded control surface being aligned with the second rounded control surface;
a first sensor to detect force on the first cap actuator applied to any of four quadrants parallel to the first surface; and
a second sensor to detect force on of the second cap actuator applied to any of four quadrants parallel to the second surface, and
a third sensor to detect a rotational force about the first cap actuator and a fourth sensor to detect a rotational force about the second cap actuator,
wherein the system is to determine inputs for five of six degrees of freedom based on forces detected by the first sensor and the second sensor for the four quadrants of the first sensor and the second sensor, the five of six degrees of freedom being translation about a first axis parallel to the first surface and second surface, translation about a second axis parallel to the first surface and second surface and orthogonal to the first axis, translation about a third axis orthogonal to the first surface and the second surface and passing through a center of the first cap actuator and the second cap actuator, rotation about the first axis, and rotation about the second axis; and
wherein the system is to determine input for a sixth degree of freedom based on rotational forces detected by the third sensor and the fourth sensor, the sixth degree of freedom being a rotation about the third axis.

19. The system of claim 18, wherein the system is a laptop computer, and wherein the casing includes a display casing holding a display.

20. The system of claim 19, further comprising a second 3D controller, and wherein the 3D controller is installed in a first side of the display casing and the second 3D controller is installed in an opposite second side of the display casing.

21. The system of claim 18, wherein the first surface is a surface that faces a user operating the system and wherein the second surface is a surface that faces away from a user operating the system.

22. A non-transitory computer-readable storage medium having stored thereon data representing sequences of instructions that, when executed by a processor, cause the processor to perform operations comprising:
detecting forces on a first actuator of a control apparatus and a second actuator of the control apparatus, wherein detecting the force includes detection of one or more of:

forces on any of four quadrants of a first sensor for the first actuator, forces on any of four quadrants of a second sensor for the second actuator, and a rotational force about the first actuator detected by a third sensor and a rotational force around the second actuator detected by a fourth sensor; and interpreting the forces as one of a plurality of inputs including:

determining inputs for five of six degrees of freedom based on forces detected by the first sensor and the second sensor for the four quadrants of the first sensor and the second sensor, the five of six degrees of freedom being translation about a first axis parallel to the first surface and second surface, translation about a second axis parallel to the first surface and second surface and orthogonal to the first axis, translation about a third axis orthogonal to the first surface and the second surface and passing through a center of the first cap actuator and the second cap actuator, rotation about the first axis, and rotation about the second axis; and determining an input for a sixth degree of freedom based on rotational forces detected by the third sensor and the fourth sensor, the sixth degree of freedom being a rotation about the third axis.

\* \* \* \* \*